US012627380B2

(12) United States Patent
Hairapetian et al.

(10) Patent No.: US 12,627,380 B2
(45) Date of Patent: May 12, 2026

(54) COMMUNICATION INTERFACE UNIT

(71) Applicant: TeraSignal Corp., Irvine, CA (US)

(72) Inventors: Armond Hairapetian, Irvine, CA (US);
Christopher R. Doerr, Middletown, NJ
(US)

(73) Assignee: TeraSignal Corp., Irvine, CA (US)

( * ) Notice: Subject to any disclaimer, the term of this
patent is extended or adjusted under 35
U.S.C. 154(b) by 353 days.

(21) Appl. No.: 18/099,110

(22) Filed: Jan. 19, 2023

(65) Prior Publication Data

US 2024/0250756 A1     Jul. 25, 2024

(51) Int. Cl.
*H04B 10/80*          (2013.01)

(52) U.S. Cl.
CPC ......... *H04B 10/801* (2013.01); *H04B 10/806*
(2013.01)

(58) Field of Classification Search
CPC .... H04B 10/801; H04B 10/806; H04B 10/40;
G02B 6/43; G02B 6/428; G02B 6/4257;

G02B 6/4293; H01L 2924/15311; H01L
2924/15321; H05K 1/00; H05K 1/18;
H05K 1/189; H05K 1/182; H05K 1/16
See application file for complete search history.

(56) References Cited

U.S. PATENT DOCUMENTS 10,866,376 B1 * 12/2020 Ghiasi ................. G02B 6/4292
2022/0263586 A1 * 8/2022 Winzer ............... G02B 6/4293

* cited by examiner

*Primary Examiner* — Hibret A Woldekidan
(74) *Attorney, Agent, or Firm* — KPPB LLP

(57)                    ABSTRACT

An optical input/output (I/O) system includes at least one
electronic circuit die on at least one first substrate on a first
side of a printed circuit board (PCB), where the at least one
electronic circuit die includes at least 4 electrical inputs and
at least 4 electrical outputs that are each configured to
operate with a speed of at least 10 Gb/s. The optical I/O
system also includes at least one photonic circuit die on at
least one second substrate on a second side of the PCB,
opposite the first side of the PCB. A plurality of electrical
connections are implemented through the PCB, and electri-
cally connect the at least one photonic circuit die with the at
least 4 electrical inputs and the at least 4 electrical outputs
of the at least one electronic circuit die.

28 Claims, 9 Drawing Sheets

420

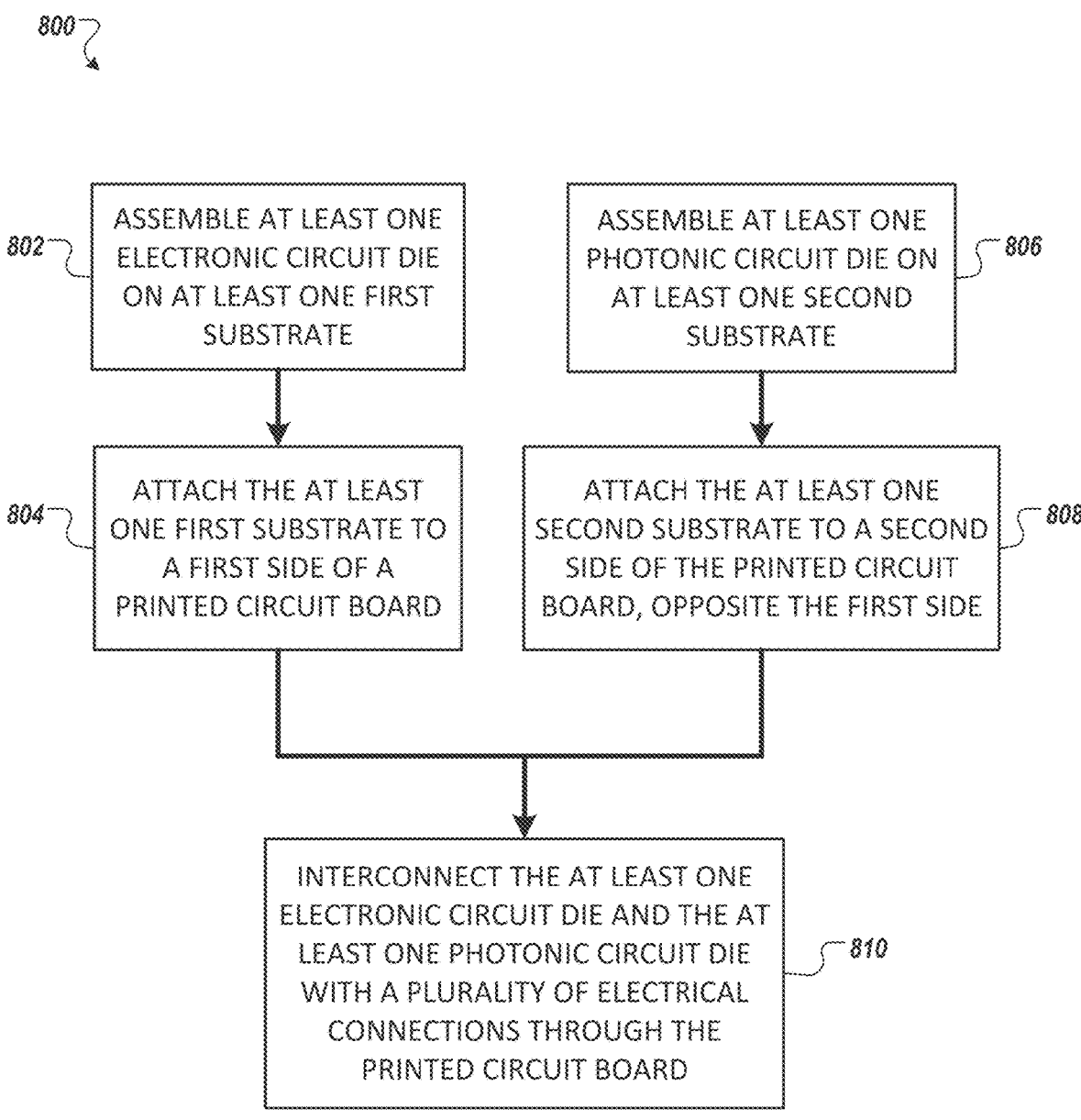

_800_

_802_ ASSEMBLE AT LEAST ONE ELECTRONIC CIRCUIT DIE ON AT LEAST ONE FIRST SUBSTRATE

_806_ ASSEMBLE AT LEAST ONE PHOTONIC CIRCUIT DIE ON AT LEAST ONE SECOND SUBSTRATE

_804_ ATTACH THE AT LEAST ONE FIRST SUBSTRATE TO A FIRST SIDE OF A PRINTED CIRCUIT BOARD

_808_ ATTACH THE AT LEAST ONE SECOND SUBSTRATE TO A SECOND SIDE OF THE PRINTED CIRCUIT BOARD, OPPOSITE THE FIRST SIDE

_810_ INTERCONNECT THE AT LEAST ONE ELECTRONIC CIRCUIT DIE AND THE AT LEAST ONE PHOTONIC CIRCUIT DIE WITH A PLURALITY OF ELECTRICAL CONNECTIONS THROUGH THE PRINTED CIRCUIT BOARD

FIG. 8

COMMUNICATION INTERFACE UNIT

TECHNICAL FIELD

The present disclosure generally relates to photonic integrated circuits (PICs).

BACKGROUND

Modern communication and computing architectures increasingly rely on semiconductor based integrated circuits with large numbers of high-speed input/output (I/O) connections to transfer enormous amounts of data for high-speed communications and computations. Examples include high throughput switches for networking, and computing clusters for high-performance computing (HPC), and artificial intelligence (AI) applications where numerous interconnected servers must communicate massive data sets for near-real-time performance. Other examples include massive MIMO cellular base stations and optical telecommunications systems where core network interconnections and intelligent edge computing must provide high bandwidth and low latency communication for a variety of consumer, autonomous vehicle, and industrial Internet-of-Things (IOT) applications.

SUMMARY

One general aspect of the present disclosure includes an optical input/output (I/O) system including: at least one electronic circuit die on at least one first substrate on a first side of a printed circuit board (PCB), where the at least one electronic circuit die includes at least 4 electrical inputs and at least 4 electrical outputs that are each configured to operate with a speed of at least 10 Gb/s. The optical I/O system also includes at least one photonic circuit die on at least one second substrate on a second side of the PCB, opposite the first side of the PCB. The optical I/O system also includes a plurality of electrical connections through the PCB that electrically connect the at least one photonic circuit die with the at least 4 electrical inputs and the at least 4 electrical outputs of the at least one electronic circuit die.

Implementations may include one or more of the following features. The optical I/O system where the plurality of electrical connections through the PCB include a plurality of straight-line vias in the PCB that connect the at least one photonic circuit die with the at least 4 electrical inputs and the at least 4 electrical outputs of the at least one electronic circuit die. The optical I/O system where the at least one first substrate is attached to the first side of the PCB by a first ball-grid array (BGA). The optical I/O system may also include where the at least one second substrate is attached to the second side of the PCB by a second BGA. The optical I/O system where the first BGA and the second BGA are connected to the plurality of electrical connections. The optical I/O system where the at least one second substrate on the second side of the PCB includes a plurality of second substrates that are stacked on each other. The optical I/O system where the at least one photonic circuit die on the second side of the PCB includes at least one photonic integrated circuit (PIC) including at least one of a transmitter PIC or a receiver PIC. The optical I/O system where the optical I/O system further includes at least one of (i) driving circuitry for the transmitter PIC or (ii) transimpedance amplification (TIA) circuitry for the receiver PIC. The optical I/O system where at least one of the driving circuitry for the transmitter PIC or the TIA circuitry for the receiver PIC is integrated in the at least one electronic circuit die. The optical I/O system where at least one of the driving circuitry for the transmitter PIC or the TIA circuitry for the receiver PIC is implemented as electronic die on the second side of the PCB, adjacent to the transmitter PIC or the receiver PIC. The optical I/O system where at least one of the driving circuitry for the transmitter PIC or the TIA circuitry for the receiver PIC includes a complementary metal-oxide semiconductor (CMOS) equalizer. The optical I/O system further including control circuitry for the at least one PIC, which is implemented either inside at least one electronic integrated circuit (EIC) for the at least one PIC or in a separate EIC. The optical I/O system where the at least one PIC includes a plurality of PICs that are attached to a second substrate among the at least one second substrate. The optical I/O system where a first PIC is attached to a first side of the second substrate that faces towards the PCB. The optical I/O system where a second PIC is attached to a second side of the second substrate that faces away from the PCB, opposite the first side of the second substrate. The optical I/O system where the at least one second substrate is arranged on at least one edge of the second side of the PCB. The optical I/O system further including a lid for the at least one photonic circuit die that includes mounts for a plurality of fiber array connectors. The optical I/O system where the at least one photonic circuit die includes photonic circuits that are made from silicon photonics. The optical I/O system where the at least one photonic circuit die on the second side of the PCB includes a planar lightwave circuit (PLC) that is connected to at least one PIC and to at least one optical fiber. The optical I/O system where the PLC includes a waveguide power splitter. The optical I/O system where the PLC includes at least one of a wavelength multiplexer or a wavelength demultiplexer. The optical I/O system where the PLC overhangs an edge of a substrate among the at least one second substrate. The optical I/O system where the at least one photonic circuit die are arranged along a perimeter surrounding a region in which components for the at least one electronic circuit die are arranged.

Another general aspect of the present disclosure includes a method of co-packaging at least one electronic circuit die with at least one photonic circuit die on a printed circuit board (PCB), the method including: assembling the at least one electronic circuit die on at least one first substrate. The method also includes assembling the at least one photonic circuit die on at least one second substrate. The method also includes attaching the at least one first substrate to a first side of the PCB, and attaching the at least one second substrate to a second side of the PCB, opposite the first side of the PCB. The method also includes interconnecting the at least one electronic circuit die and the at least one photonic circuit die with a plurality of electrical connections through the PCB.

Implementations may include one or more of the following features. The method where the at least one electronic circuit die includes at least 4 electrical inputs and at least 4 electrical outputs that are each configured to operate with a speed of at least 10 Gb/s. The method where assembling the at least one photonic circuit die on the at least one second substrate includes: assembling a plurality of photonic circuit die on a plurality of second substrates that are stacked on each other. The method where assembling the at least one photonic circuit die on the at least one second substrate includes: attaching a plurality of photonic integrated circuits (PICs) to a second substrate among the plurality of second substrates. The first PIC may be attached to a first side of the second substrate that faces towards the PCB, and a second PIC may be attached to a second side of the second substrate that faces away from the PCB, opposite the first side of the second substrate. The at least one photonic circuit die may be arranged along a perimeter surrounding a region in which components for the at least one electronic circuit die are arranged. The method where attaching the at least one first substrate to the first side of the PCB includes soldering the at least one first substrate to the first side of the PCB by a first ball-grid array (BGA). The method where attaching the at least one second substrate to the second side of the PCB includes soldering the at least one second substrate to the second side of the PCB by a second BGA. The method where the first BGA and the second BGA are connected to the plurality of electrical connections. The method where the plurality of electrical connections through the PCB include a plurality of straight-line vias in the PCB that connect the at least one photonic circuit die with at least 4 electrical inputs and at least 4 electrical outputs of the at least one electronic circuit die.

Another general aspect of the present disclosure includes an optical input/output (I/O) system including: at least one electronic circuit die on at least one first substrate on a first side of a printed circuit board (PCB). The optical I/O system also includes at least one photonic circuit die on at least one second substrate on a second side of the PCB, opposite the first side of the PCB. The optical I/O system also includes means for electrically connecting the at least one photonic circuit die with the at least one electronic circuit die.

Another general aspect of the present disclosure includes an optical input/output (I/O) system including: at least one electronic circuit die on at least one first substrate on a first side of a printed circuit board (PCB), wherein the at least one electronic circuit die includes at least 4 electrical inputs and at least 4 electrical outputs that are each configured to operate with a speed of at least 10 Gb/s; at least one connector on at least one second substrate on a second side of the PCB, opposite the first side of the PCB, wherein the at least one connector includes at least one pluggable socket; and a plurality of electrical connections through the PCB that electrically connect the at least one connector with the at least 4 electrical inputs and the at least 4 electrical outputs of the at least one electronic circuit die.

BRIEF DESCRIPTION OF THE DRAWINGS

FIG. 8 is a flow chart illustrating an example of interconnecting electronic circuit die with photonic circuit die on opposite sides of a PCB.

DETAILED DESCRIPTION

The present disclosure generally relates to photonic integrated circuits (PICs). For example, some implementations are directed to partitioning, assembly, and packaging of high-throughput integrated circuits with PICs.

High-performance communication and computing architectures often utilize large electronic subsystems with a large electrical I/O count operating at high data rates, such as an application-specific integrated circuit (ASIC) that performs switching or computing for a cluster. Such high-speed, large-I/O-count electronic subsystems place tremendous bandwidth demands on the system. To accommodate these increased bandwidth demands, optical communications are replacing electrical connections, in order to leverage higher data rates, lower latency, and improved reliability of optical communications. In such systems, a large number of pluggable optical transceivers are connected to the large-I/O count electronic subsystem to transfer massive amounts of data between the large-I/O count electronic subsystem and other processing, storage, and networking components. However, in such scenarios where the electronic subsystem has a large electrical I/O count, the communication between the large I/O count electronic subsystem and the pluggable optical transceivers can be a bottleneck. Also, in some scenarios, such a system may require long electrical links connecting the large I/O count electronic subsystem (e.g., an ASIC) and the pluggable optical transceivers. In such scenarios, the large number of long electrical links can consume significant power and require significant complexity.

As the number of high-speed I/O pins on semiconductor devices increase, routing the connections horizontally on the printed circuit board (PCB) where the devices are assembled becomes increasingly difficult. Increasing the number of high-speed I/O pins increases the number routing layers as well as the number of layer to layer via transitions resulting in additional cost and impairment in signal integrity due to imperfect impedance matching and insertion losses. Various approaches such as 3-D packaging, using flyover copper cables or co-packaging semiconductors with optics have been proposed to eliminate the routing problem on the PCB.

Figure 1:
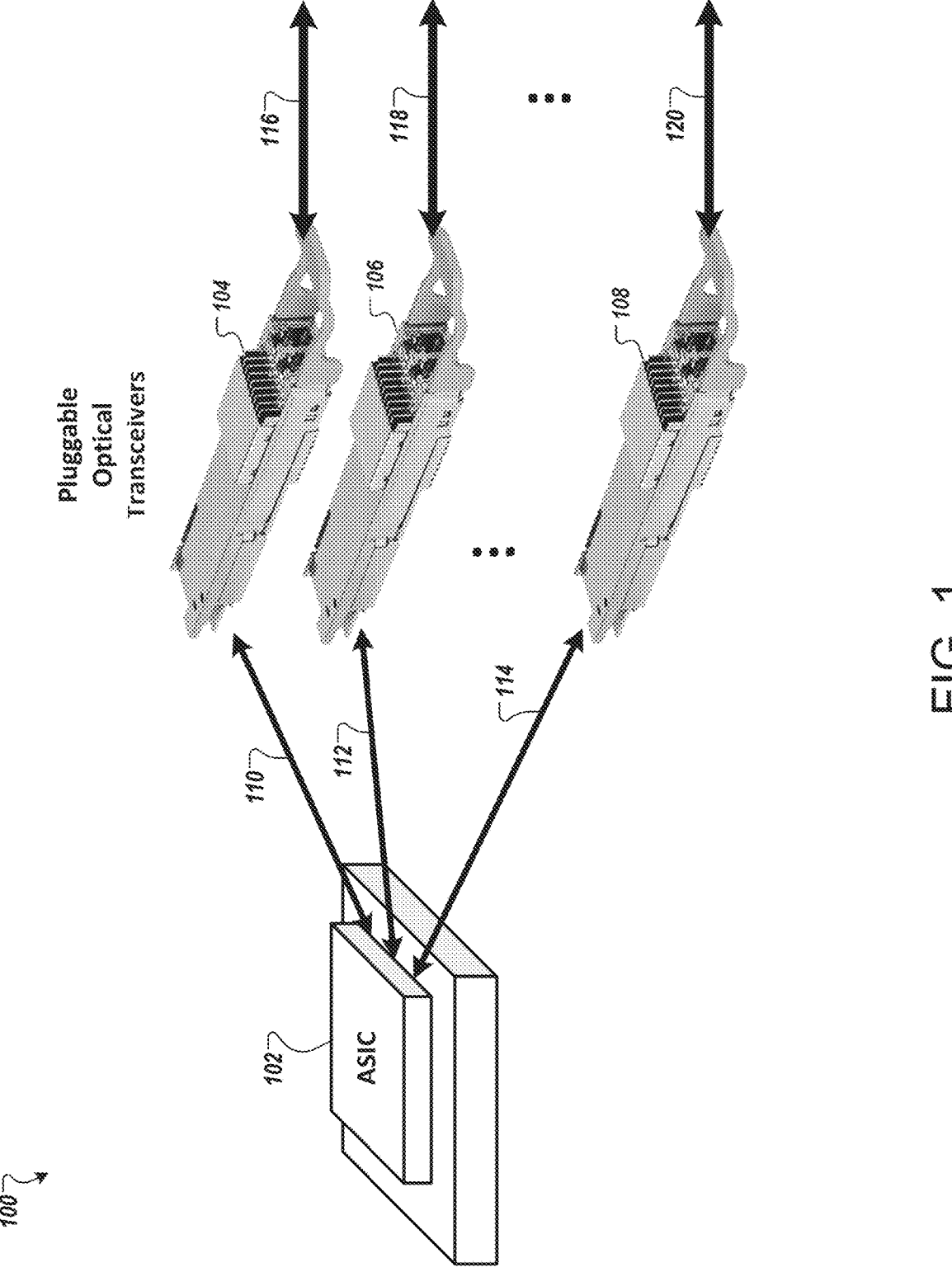
FIG. 1 illustrates an example of one possible configuration for interconnecting a high-speed and high I/O-count electronic subsystem to optical transceivers.

For example, FIG. 1 illustrates an example system 100 that shows one possible configuration for interconnecting a high-I/O-count electronic subsystem to pluggable optical transceivers, which can potentially suffer from the above-described bottleneck effect. In this example, electronic subsystem 102 utilizes a large electrical I/O count, such as an ASIC that performs switching or computing for a cluster. The electronic subsystem 102 may, for example, consist of a single die or multiple die, such as die that use Universal Chiplet Interconnect Express (UCIe™) interfaces. For convenience of exposition, the electronic subsystems (such as electronic subsystem 102) throughout this disclosure are assumed to be a single die and will be referred to as an ASIC.

The ASIC 102 connects its numerous high-speed electrical I/O to pluggable optical transceivers (such as pluggable optical transceivers 104, 106, and 108) through electrical connections 110, 112, and 114. The pluggable optical transceivers 104, 106, and 108 perform retiming and reshaping of the electrical signals that are received through electrical connections 110, 112, and 114, and convert the electrical signals to optical signals, which are transmitted through optical fibers (e.g., optical fibers 116, 118, and 120). The pluggable optical transceivers 104, 106, and 108 are typically implemented at the faceplate of the shelf in which the system 100 resides.

However, the example system 100 can suffer numerous disadvantages. For example, because the pluggable optical transceivers 104, 106, and 108 are implemented at the faceplate, this results in long electrical traces through electrical connections 110, 112, and 114. As baud rate increases, these long traces through electrical connections 110, 112, and 114 become very lossy and difficult to equalize. For example, to compensate for loss through these long traces of electrical connections 110, 112, and 114, the pluggable optical transceivers 104, 106, and 108 typically perform retiming and reshaping of the electrical signals that are received through electrical connections 110, 112, and 114, but this can significantly add to complexity and power consumption.

According to implementations of the present disclosure, the aforementioned disadvantages can be overcome by implementing the optics (e.g., optical transceivers) as photonic integrated circuits (PICs) arranged directly under the ASIC 102, on the opposite side of a printed circuit board (PCB). Implementations of the present disclosure enable novel co-packaging of PICS with electronic integrated circuits. In some implementations, the PIC(s) are housed in a Communication Interface Unit (hereinafter "CIU") which is arranged on the opposite side of the PCB from the electronic integrated circuits. Electrical vias are implemented through the PCB to connect the PIC(s) on one side of the PCB with the electronic integrated circuits on the other side of the PCB. By implementing the PIC(s) and the electronic integrated circuits on opposite sides of the PCB, the CIU co-packaging technique can provide numerous benefits, including improvements in thermal management, power supply integrity, manufacturing yield, power consumption, and signal integrity. In particular, the CIU according to implementations of the present disclosure can provide significant benefits when complementing electronic subsystems that implement a large number of electrical I/O interfaces operating at high-speed data rates.

Figure 2:
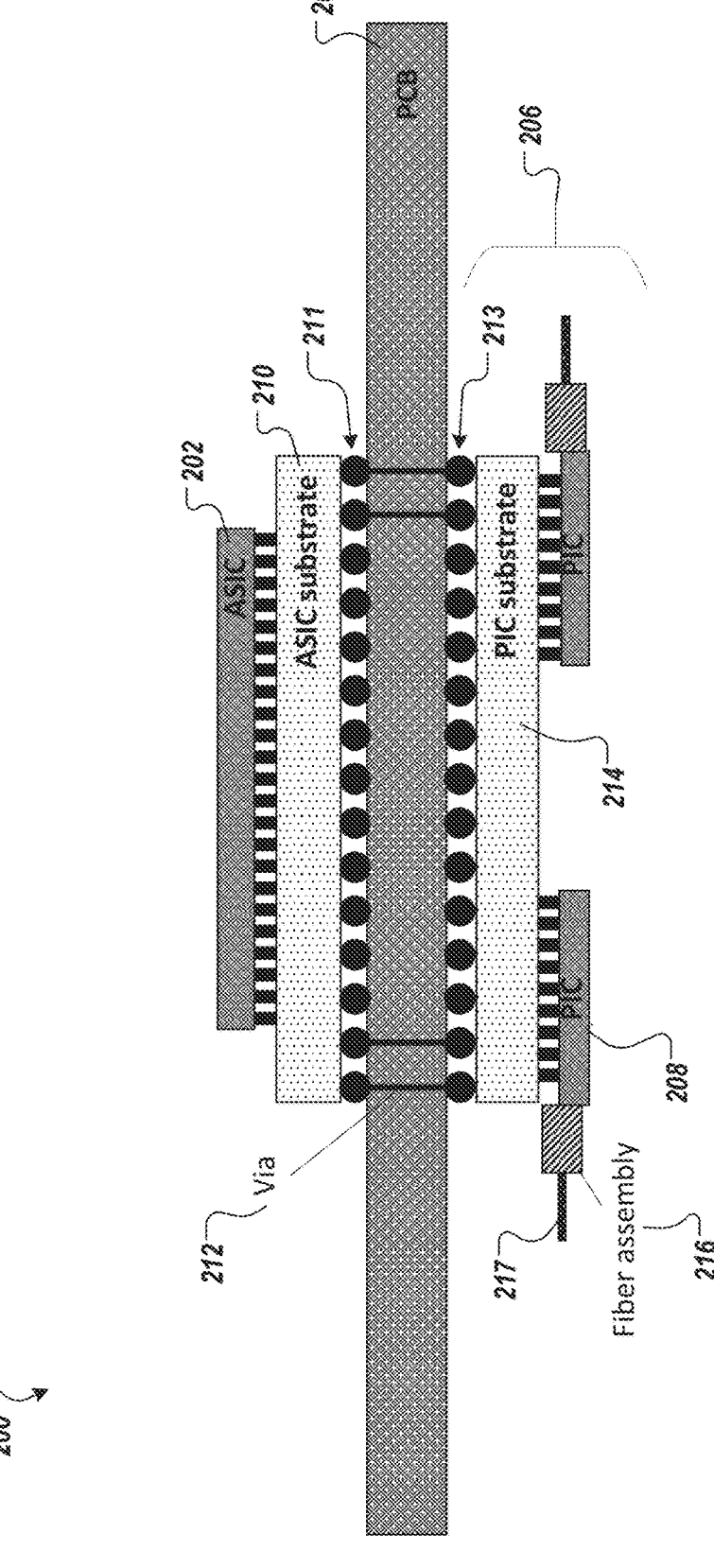
FIG. 2 illustrates an example of an implementation of the present disclosure, in which a high throughput integrated circuit is assembled with a Communication Interface Unit (CIU) on opposite sides of a printed circuit board (PCB)

FIG. 2 illustrates an example configuration 200 in which at least one electronic circuit die (e.g., ASIC 202) is co-packaged with at least one photonic circuit die (e.g., PICs 208) housed in a Communication Interface Unit (CIU) 206, with the ASIC 202 and CIU 206 implemented on opposite sides of PCB 204.

On one side (hereinafter the "upper" side) of PCB 204, ASIC 202 is arranged on ASIC substrate 210. Although the example of FIG. 2 shows a single ASIC 202, in general the electronics implemented on the upper side of PCB 204 can be any electronic circuitry that implements a large number of I/Os, and may include, for example, processors (e.g., AI processor) and switches. In some implementations, the electronics on the upper side of PCB 204 can be a monolithic device or a multichip module (MCM) with chiplets, such as a processor with UCIe-based chiplets. The ASIC substrate 210 can the same substrate as was described with reference to FIG. 1 for the pluggable configuration, so that a special ASIC substrate does not need to be developed for the CIU configuration of FIG. 2. This can enable separate testing of ASIC 202. As such, the upper side of PCB 204 may be implemented in a manner similar to that shown in FIG. 1.

On the other side (hereinafter the "lower" side) of PCB 204, the CIU 206 houses various optical and/or electronic components, such as photonic integrated circuits (PICs) 208 (e.g., implemented with silicon photonics) and/or electronic integrated circuits (EICs). These components may be arranged on PIC substrate 214. The various optical and/or electronic components, such as PIC(s) 208, can be flip-chip bonded to PIC substrate(s) 214, or can be wire-bonded to PIC substrate(s) 214.

In some implementations, optical fibers 217 are connected to optical fiber assemblies 216 which are attached to facets of PIC 208. In general, the optical fibers 217 can be directly attached to PIC 208, or coupled to PIC 208 via lenses, or attached to planar lightwave circuits (PLCs) (e.g., glass waveguide devices) that are attached to PICs 208. In the latter case, the PLC(s) connected to PIC(s) 208 can provide optical connection and optical fan in/out. In some implementations, the PLC can also contain laser power splitting and wavelength multiplexing/demultiplexing. The laser power splitting may be used to split the incoming high-power laser light into multiple waveguides for the multiple channels in the PICs 208. This reduction of light intensity reduces nonlinearities and the possibility of damage to the waveguides in the PIC 208. The wavelength multiplexing can be used to multiplex multiple wavelength signals from the transmitter PIC into one waveguide and demultiplex multiple wavelength signals being sent to the receiver PIC. Wavelength multiplexing and demultiplexing reduces the number of fiber connections to the CIU 206. The CIU 206 can use intensity-modulated direct detection (IMDD), coherent technology, or related technologies for communication through optical fibers 217. In some implementations, an additional support structure (e.g., a fiber carrier substrate) can be implemented in CIU 206 to hold and route the optical fibers 217 to the edge(s) of PCB 204.

The unit including PIC substrate(s) 214, PICs 208, as well as associated electronic circuits and optical fibers, form the communication interface unit (CIU) 206. In some implementations, PICs 208 and/or associated electronics and optical fibers may be implemented on one or more edges of PIC substrate 214. This can help reduce potential interference between the optical fibers 217 and other components of CIU 206.

In general, the CIU 206 on the bottom side of PCB 204 can include various types of components (in addition to communication components) thereby relieving geometric space constraints on the upper side of PCB 204. In some implementations, the CIU 206 can house active photonics (e.g., lasers, optical amplifiers, etc.), passive photonics (e.g., modulators, attenuators, photodiodes, MUX, DMUX, etc.), active electronics (e.g., transistor based integrated circuits, etc.), passive electronics (capacitors, resistors, inductors, resonators, etc.), and/or direct-attach copper cables and connectors. In some implementations, the CIU 206 can house various peripheral components such as power supplies, voltage regulators, crystal oscillators, and other peripheral components that operate in conjunction with the top-side electronics. In some implementations, the various components of the CIU 206 can be arranged as different chiplets mounted on the PIC substrate 214 functioning as an interposer that enables communication between the different chiplets (e.g., using the UCIe™ communication standard). In some implementations, the CIU 206 may be implemented with just passive fly-over copper cables that connect to a front panel and/or that connect to other chips on the PCB 204.

In some implementations, the CIU 206 is soldered to or is pluggable via sockets on the PCB 204. For example, the CIU 206 may be soldered to the PCB 204 by a ball-grid array (BGA), in some cases secured by underfill. In some implementations, the CIU 206 is soldered to the PCB 204 by controlled collapse chip connection (C4) bumps. In some implementations, CIU 206 consists of multiple sections, each soldered or pluggable to the PCB 204. In the example of FIG. 2, ASIC substrate 210 and PIC substrate 214 are each mounted to PCB 204 with separate BGAs, namely ASIC substrate 210 is mounted to PCB 204 with a first BGA 211, and PIC substrate 214 is mounted to PCB 204 with a second BGA 213.

To provide electrical I/O connections between ASIC 202 and CIU 206, numerous vias 212 are implemented through PCB 204 to electrically connect ASIC 202 and CIU 206. For example, the vias 212 connect directly to BGA 211 with BGA 213 as shown in FIG. 2. The vias 212 provide high-speed electrical I/O between ASIC 202 and CIU 206. In some implementations, each of the vias 212 provides at least 10 Gb/s communication speed between ASIC 202 and CIU 206. Thus, the vias 212 effectively replace the long traces of electrical connections 110, 112, and 114 that were described in the example of FIG. 1, above. The much shorter distances that electrical signals travel through the vias 212 (as compared to the electrical connections 110, 112, and 114 of FIG. 1) enable improved signal integrity in the high-speed, large-count electronic signals that must travel between the ASIC 202 and the CIU 206, and can obviate the need to implement re-timers outside the ASIC 202.

The number of vias 212 can be large, to accommodate a large number of I/Os in ASIC 202. For example, in some implementations, the number of vias 212 (and/or the number of I/Os in ASIC 202) is greater than or equal to 4 or 6. In some implementations, the number of vias 212 (and/or the number of I/Os in ASIC 202) is greater than or equal to 10. In some implementations, the number of vias 212 (and/or the number of I/Os in ASIC 202) is greater than or equal to 15. In some implementations, the number of vias 212 (and/or the number of I/Os in ASIC 202) is greater than or equal to 20. In general, the large number of vias 212 enable implementation of a large-I/O count ASIC 202 to communicate with numerous PICs 208 which are implemented on the bottom side of the PCB 204. However, implementations of the present disclosure are not limited to a particular number of vias 212 or a particular number of I/Os in ASIC 202. For example, in some implementations, a single via 212 and/or a single I/O in the ASIC 202 may be implemented. In some implementations, a single I/O may include both an electrical input and an electrical output.

In some implementations, one or more or all of the vias 212 can be implemented as straight-line connections for shortest distance between the ASIC substrate 210 and PIC substrate 214. Such short-distance vias 212 can provide higher bandwidth and improved integrity for the electrical signals traveling through PCB 204, even when communicating through lossy PCB materials such as FR4. As such, in some implementations, the shorter traces through vias 212 can enable improved signal integrity in communication between ASIC 202 and CIU 206 without the need for complex circuitry to perform retiming and reshaping, thereby enabling the implementation of direct-drive PICs in some scenarios.

In implementations where the vias 212 are straight-line connections, the ASIC substrate 210 and PIC substrate 214 may each be connected to PCB 204 in mirror-image connection patterns. For example, if ASIC substrate 210 and PIC substrate 214 are each mounted to PCB 204 with separate BGAs 211 and 213, and if the vias 212 are straight-line connections, then the BGA arrangement on each of ASIC substrate 210 and PIC substrate 214 (e.g., BGA 211 and BGA 213) may be mirror-images of each other.

By implementing CIU 206 and ASIC 202 on opposite sides of PCB 204, this can provide numerous advantages. For example, by implementing CIU 206 and ASIC 202 on opposite sides of PCB 204, the high-speed electrical connections between ASIC 202 and optics in CIU 206 are very short, which improves signal integrity and reduces power consumption. As another example, by implementing CIU 206 and ASIC 202 on opposite sides of PCB 204, this can enable improved thermal management, since the thermal management of top side electronics in ASIC 202 can be separated from that of CIU 206, and improve heat dissipation of ASIC 202 and PIC 208. As another example, by implementing CIU 206 and ASIC 202 on opposite sides of PCB 204, this can enable improved power supply integrity as compared to implementing the PIC 208 on top of the ASIC 202, since the power supplies for top side electronics and CIU 206 can be independent with minimal cross talk between them. As another example, by implementing CIU 206 and ASIC 202 on opposite sides of PCB 204, this can enable less power consumption. For example, power consumption can be reduced by enabling improved signal integrity due to shorter copper traces in CIU 206. As another example, power consumption can be reduced by enabling less power drop in power supply vias (among vias 212), in particular by separating the power supply vias for CIU 206 and top side electronics and enabling improved power supply distribution by splitting the direction of power supplied by PCB 204 into both upwards and downward directions (rather than directing all of the power supply current in one direction, as would be the case if the PICs were implemented above ASIC 202). As another example, by implementing CIU 206 and ASIC 202 on opposite sides of PCB 204, this can enable engineering the vias 212 as more effective transmission lines for communication between CIU 206 and ASIC 202, as compared to the more limited TSVs which are typically implemented in multi-layer architectures on a single side of PCB 204. As a further example, by implementing CIU 206 and ASIC 202 on opposite sides of PCB 204, this can enable improved arrangements of optical fibers (e.g., optical fibers 217), by arranging the optical fibers to connect with fiber assemblies (e.g., fiber assembly 216) on the lower side of PCB 204, without interfering with electronics on the upper side of PCB 204. As yet another example, by implementing CIU 206 and ASIC 202 on opposite sides of PCB 204, this can enable improved manufacturing yield by separating top-side electronics from CIU 206, resulting in improved overall manufacturing yield of the system and lower cost systems. As another example, by implementing CIU 206 and ASIC 202 on opposite sides of PCB 204, this can enable lower-cost manufacturing, since both the top side electronics and CIU can be manufactured and tested independently using standard high volume semiconductor manufacturing process, thereby minimizing manufacturing and assembly cost. As a further example, by implementing CIU 206 and ASIC 202 on opposite sides of PCB 204, the CIU 206 can be implemented in a flexible manner with a variety of different ASIC packages and can enable separate testing and yielding of the CIU 206 and ASIC 202. In some scenarios, the ASIC 202 on the upper side of PCB 204 can be packaged, tested, heat sunk, and power-supplied in a manner similar to that of a configuration that uses pluggable modules (e.g., as shown in FIG. 1). As yet another example, by implementing CIU 206 and ASIC 202 separately on opposite sides of PCB 204, this can enable lower-cost 3-D integration, whereby CIU 206 can provide 3-D integration on just one side of PCB 204 without using special processes to co-package with ASIC 202 which can increase cost and reduce reliability.

The aforementioned advantages of the CIU structure of FIG. 2 can help overcome some possible challenges of the CIU structure. For example, in implementations where the CIU 206 and ASIC 202 are implemented on opposite sides of PCB 204, there may be challenges in aligning the BGAs (e.g., BGAs 211 and 213) on opposite sides of PCB 204 to ensure straight-line vias 212. As another example, there may be challenges in performing high-speed communication through BGAs 211 and 213. However, the numerous advantages of implementing CIU 206 and ASIC 202 on opposite sides of PCB 204, as described above, can overcome these potential challenges and enable improvements as compared to designs where PICs are implemented on the same side of the PCB as the ASIC, or designs where the PICs are implemented remotely from the ASIC (as shown in FIG. 1).

In some implementations, the CIU 206 includes only electrical components, including active electronics (e.g., transistor based integrated circuits) and/or passive electronics (e.g., capacitors, resistors, inductors, resonators, connectors, etc.), without any photonic components. For example, in some implementations, the CIU 206 may include one or more connectors, such as pluggable sockets. Such connectors can provide input/output connection points for the ASIC 202 by way of the vias 212.

Although the example of FIG. 2 shows single layers of electronics and optics implemented in a 1-D arrangement on each side of the PCB 204, in general, there may be multiple layers of electronics and/or optics on each side of the PCB 204. For example, multiple layers of electronics and/or optics may be arranged in a 2.5-D or a 3-D arrangement on one or more sides of the PCB 204. Therefore, a variety of 1-D, 2.5-D, or 3-D packing options can be used for either side of the PCB 204. Examples of packing options include system-on-chip (SoC), which includes multiple functions on the same die; multi-chip modules (MCM), in which multiple die are arranged on the same substrate; 2.5-D system-in-package (SiP), in which multiple die are arranged on an interposer (e.g., glass or Si); 3-D SiP, in which multiple die are stacked on each other, with the lower die employing through through-Silicon-vias (TSVs) to provide communication pathways for the upper die. The substrates can be organic, which generally have low cost. An example of such a multi-dimensional configuration is discussed next.

Figure 3:
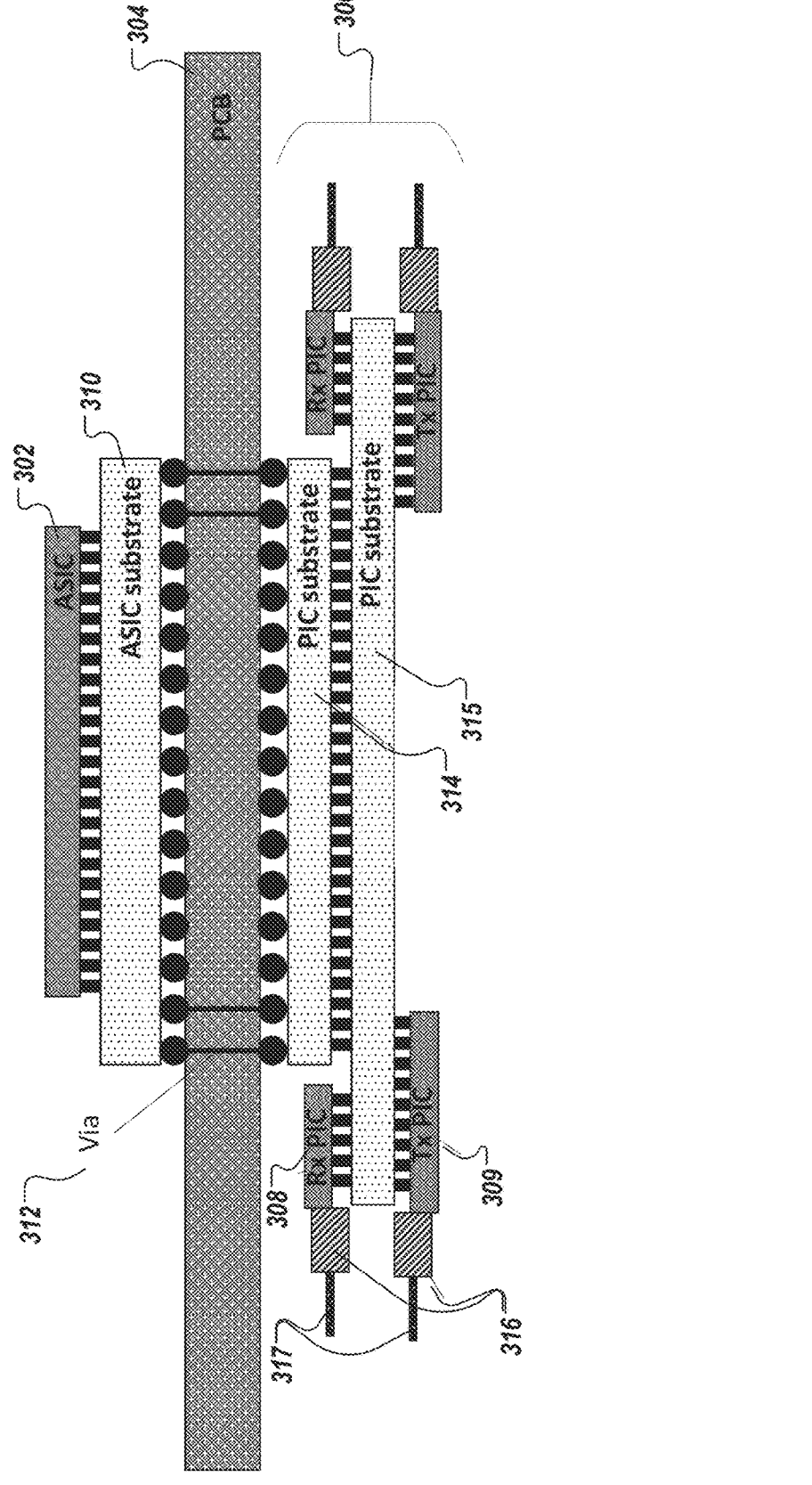
FIG. 3 illustrates an example of another implementation of the present disclosure, in which the CIU includes a plurality of stacked PIC substrates.

FIG. 3 illustrates an example configuration 300 that implements stacked PIC substrates. In this example, as in the example of FIG. 2, the ASIC 302 and ASIC substrate 310 are arranged on one side of PCB 304, and the optics in one or more CIUs 306 are arranged on the opposite side of PCB 304, and vias 212 are implemented through the PCB 204 to connect the ASIC substrate 310 with the PIC substrate(s) 314.

However, in the example of FIG. 3, the CIU(s) 306 include stacked PIC substrates, such as PIC substrate 314 and PIC substrate 315. The stacked PIC substrates 314 and 315 enable a more densely packed configuration. For example, multiple PICs, such as PIC 308 and PIC 309, may be implemented on opposite sides of one of the PIC substrates, such as the outer PIC substrate 315. Because of the optical fibers 317 connected to fiber assembly 316, in some implementations it is preferable that the PICs 308 and 309 are mounted at the outer edge of the PIC substrate 315, to avoid the optical fibers 317 having to route over or around components and/or to avoid the optical fibers 317 having to overhang the substrate edge. In some scenarios, if there is not enough perimeter at the outer edge (or "beachfront") of the PIC substrate 315 to arranged the PICs 308 and 309, then a stacked substrate configuration could be used, as shown in FIG. 3, to increase the total beachfront. In such a case, there is an inner PIC substrate(s) 314 and an outer PIC substrate(s) 315. PICs, such as PIC 308 and 309, can be attached to both sides of the outer PIC substrate(s) 315. In some implementations, receiver (Rx) PICs 308 and transmitter (Tx) PICs 309 are implemented on the inner and outer sides, respectively, of the outer PIC substrate(s) 315.

In some scenarios, the Tx PICs 309 are preferably mounted on the outer side of PIC substrate(s) 315 because the Tx PICs 309 are typically larger and often require drivers which dissipate more power as compared with transimpedance amplifiers (TIAs) of Rx PICs 308. By mounting the Tx PICs 309 on the outer side of PIC substrate(s) 315, the Tx PICs 309 can contact a lid through a thermal interface material and dissipate heat to the lid. Further details of lids are discussed in regards to FIG. 5, below.

Figure 4A:
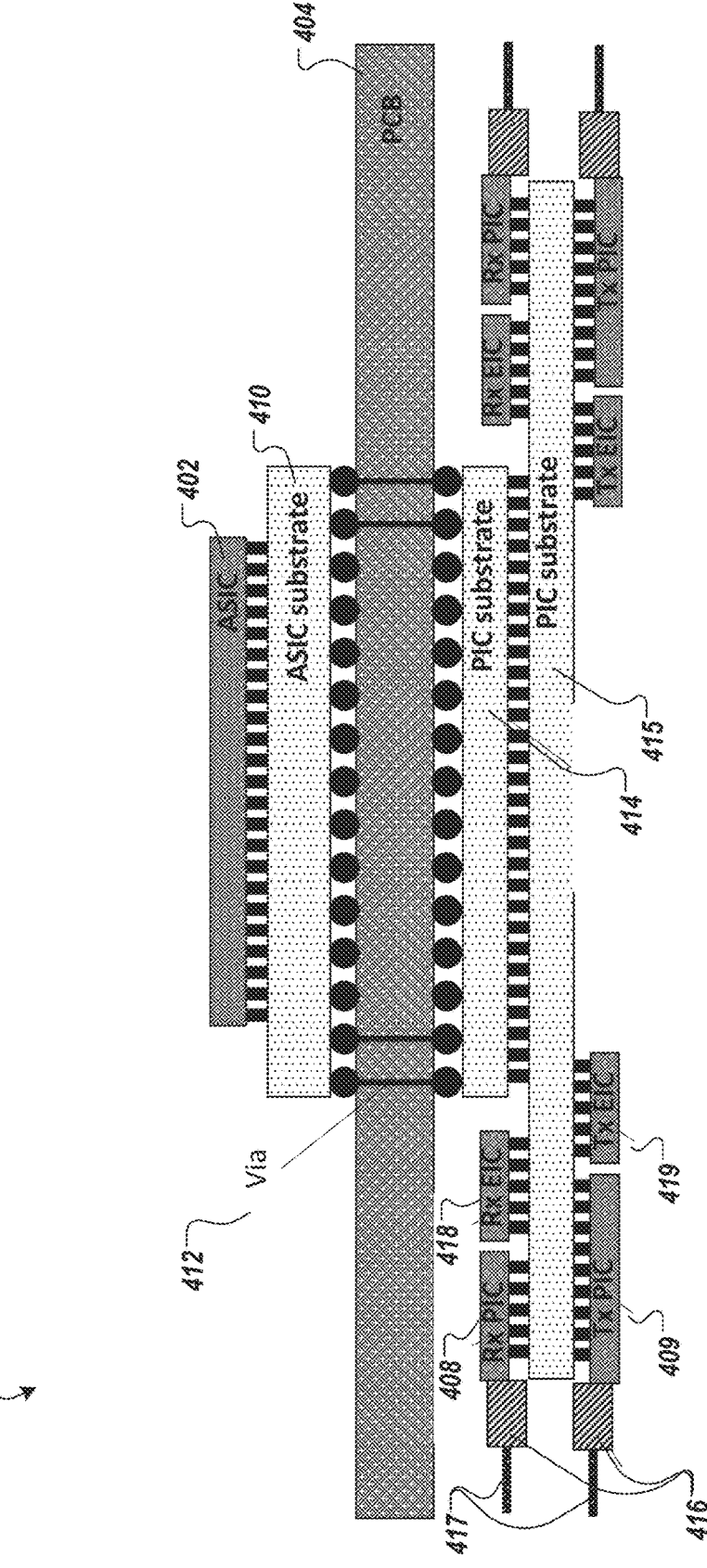
FIGS. 4A and 4B illustrate examples of a CIU configuration including electronic integrated circuits (EICs)

FIG. 4A illustrates an example configuration 400 that shows an implementation of electronic integrated circuits (EICs) that perform various operations for the optics in the CIU. In this example, as in the example of FIG. 3, the ASIC 402 and ASIC substrate 410 are arranged on one side of PCB 404, and CIU 406 is arranged on the opposite side of PCB 404, and vias 412 are implemented through the PCB 404 to connect the ASIC substrate 410 with the PIC substrate 414. The CUI(s) 406 include stacked PIC substrates 414 and 415 that implement multiple PICs 408 and 409 on opposite sides of the outer PIC substrate 415, connected optical fibers 417 via optical fiber assemblies 416. In this example, Rx PIC 408 is implemented on the inner side of PIC substrate 415, and Tx PIC 409 is implemented on the outer side of PIC substrate 415.

In general, Rx PIC 408 and Tx PICs 409 operate in conjunction with electronic circuits. Such electronic circuits can, for example, be configured to drive modulators for Tx PIC 409, amplify photocurrents for Rx PICs 408, and control elements on the PICs such as Mach-Zehnder bias controls on Tx PICs 409 or dynamic polarization demultiplexers on Rx PICs 408. In some implementations, the electronic circuits for Rx PIC 408 and Tx PICs 409 can perform electronic equalization, for example by using complementary metal-oxide semiconductor (CMOS) equalizers. There are a few possible configurations for such electronics. For example, the electronic circuits for Rx PIC 408 and Tx PICs 409 may be integrated in the ASIC 402 on the opposite side of PCB 404. As another example, the electronics for Rx PIC 408 and Tx PICs 409 may integrated in Rx PIC 408 and Tx PICs 409 themselves. As yet another example, the electronics for Rx PIC 408 and Tx PICs 409 may be implemented as separate electronic integrated circuits (EICs) in the CIU 406. This latter example is shown in FIG. 4A, where the CIU 406 includes Rx EIC 418 providing separate electronics for Rx PIC 408, and Tx EIC 419 providing separate electronics for Tx PIC 409.

The electronics in Rx EICs 418 may include transimpedance amplifiers (TIAs) that amplify received photocurrents, and/or may include electronics that perform electronic equalization. The electronics in Tx EICs 419 may include drivers that electronically control modulation, and/or may include electronics that perform electronic equalization. In some implementations, the Rx EICs 418 and/or Tx EICs 419 may be implemented as electronic die mounted on opposite sides of the outer PIC substrate 415. In some scenarios, the Tx EICs 419 dissipate more power than the Rx EICs 418, in which case it may be preferable to implement the Tx EICs 419 on the outer side of the outermost substrate to ensure the best heat sinking to a lid, as discussed next. The electronics in Tx EICs 419 or Rx EICs 418 may contain control electronics, or there may be separate control EICs. The control electronics may comprise front-end analog electronics, analog-to-digital converters, digital-to-analog converters, and/or digital processors.

Figure 4B:
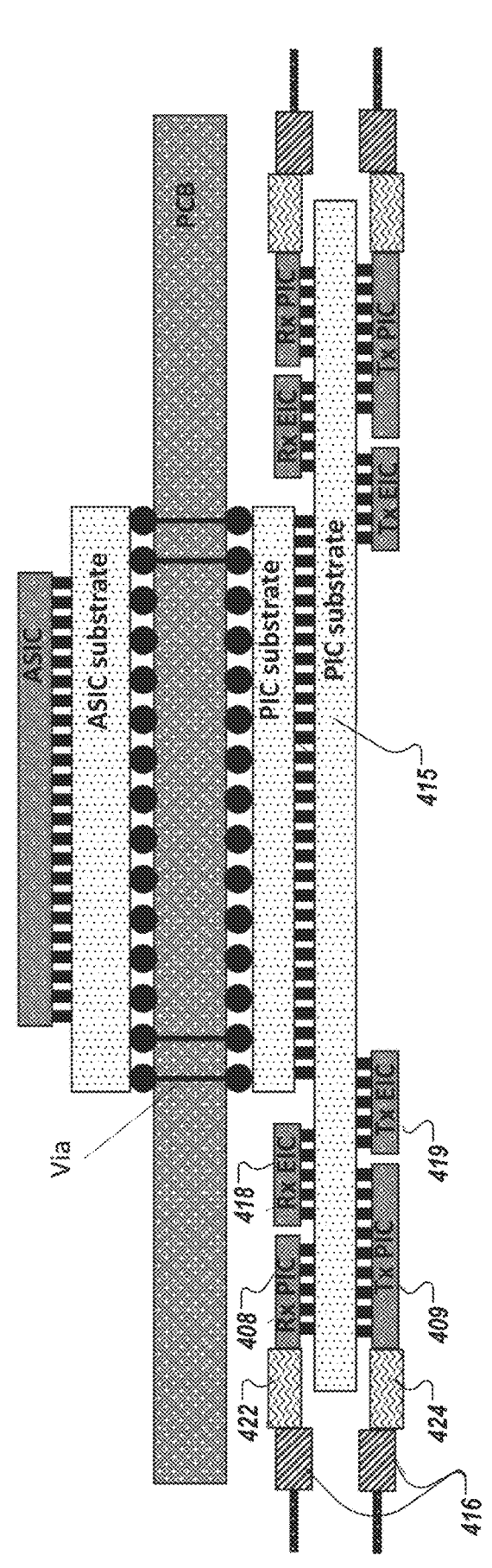

FIG. 4B illustrates another example configuration 420 that shows an implementation of EICs that perform various operations for the optics in the CIU. In this example, PLC transition elements (e.g., PLCs 422 and 424) are implemented between the PICs (e.g., PICs 408 and 409) and the fiber assemblies (e.g., fiber assemblies 416). In some implementations, PLCs 422 and 424 can be attached to the PICs 408 and 409, respectively, before the PICs 408 and 409 are flip-chip bonded to the substrate 415. This can obviate the need to overhang the PICs 408 and 409 from the substrate 415, allowing the PICs 408 and 409 to be smaller and thus saving cost, because the cost per unit area of a PIC is typically significantly higher than that of a PLC. In some implementations, the PLCs 422 and 424 can held in place by the underfill that is applied after flip-chip bonding the PICs 408 and 409 to the substrate 415.

Figure 5:
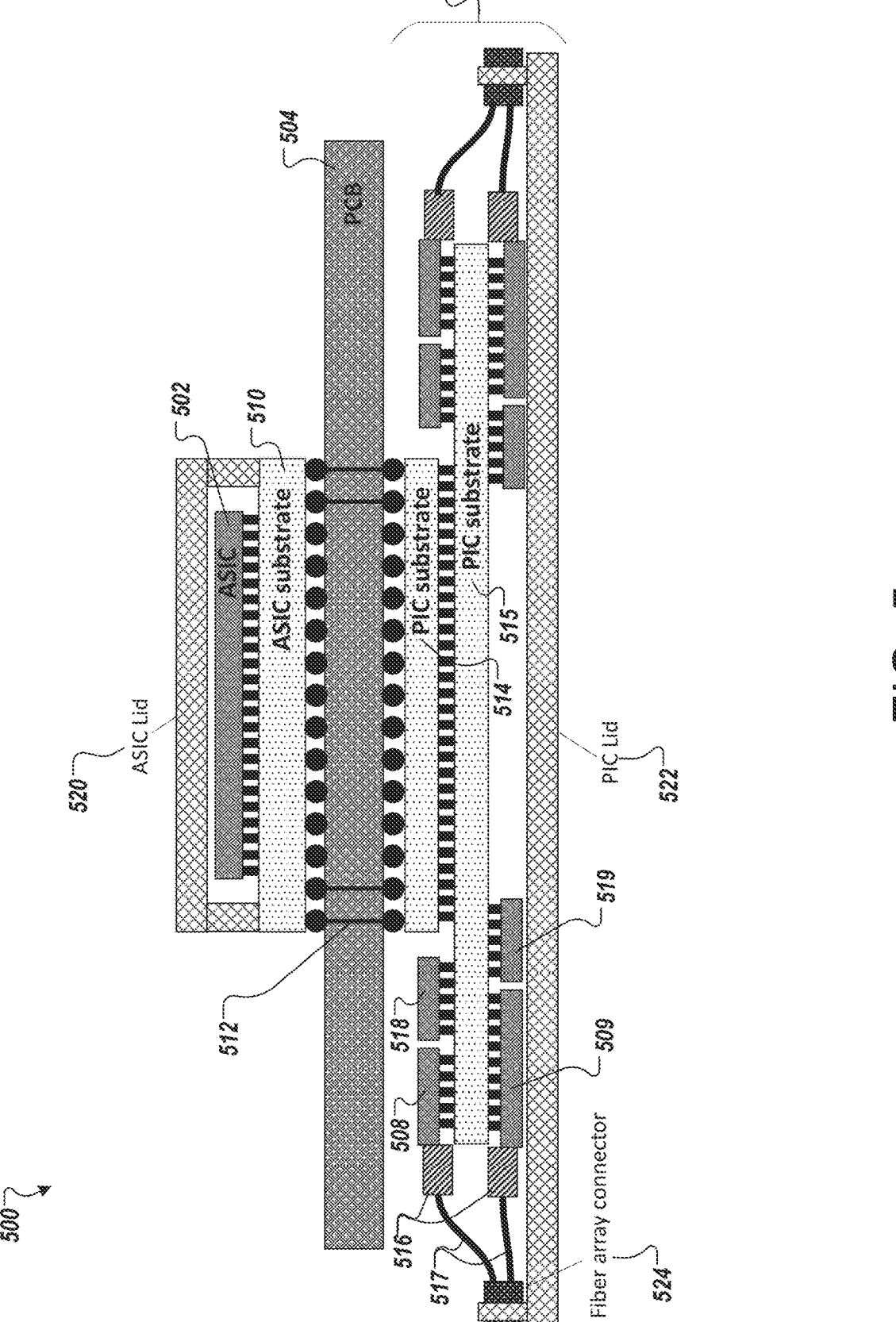
FIG. 5 illustrates an example of a CIU configuration including electronic integrated circuits (EICs) and fiber array connectors.

FIG. 5 illustrates an example configuration 500 in which lids are implemented on the ASIC and/or the CIU. In this example, as in the example of FIGS. 4A and 4B, the ASIC 502 and ASIC substrate 510 are arranged on one side of PCB 504, and one or more CIUs 506 are arranged on the opposite side of PCB 504, and vias 512 are implemented through the PCB 504 to connect the ASIC substrate 510 with the PIC substrate(s) 514. The CUI(s) 506 include multiple stacked PIC substrates 514 and 515 that implement Rx PIC 508 (and associated Rx EIC 518) and Tx PIC 509 (and associated Tx EIC 519) on opposite sides of the outer PIC substrate 515.

In addition, the example of FIG. 5 shows implementations of lids on the ASIC 502 and/or the CIU 506. For example, ASIC lid 520 is implemented on the ASIC 502. As another example, CIU lid 522 (or PIC lid) is implemented in the CIU 506. The lids can provide heat sinking and mechanical protection. The CIU lid 522 can also provide a support or a mount for fiber array connector 524, such as a Multi-fiber Push On (MPO) or Multi-fiber Termination Push-On® (MTP®) connector, which provides interconnection between the fiber assembly 516 and external fiber optic lines. In some implementations, the fiber array connector 524 may be connected to the fiber assembly 516 with interconnecting optical fibers 517, which may have slight bends to provide strain relief between the fiber array connector 524 and the fiber assemblies 516 attached to the PICs 508 and 509.

As discussed in regards to FIG. 3, above, the Tx PICs 509 and Tx EIC 519 are preferably mounted on the outer side of PIC substrates 515 because the Tx PICs 509 and Tx EIC 519 are typically larger and often require drivers which dissipate more power as compared with electronics (e.g., TIAs) in Rx EIC 518 for Rx PIC 508. By mounting the Tx PICs 509 and Tx EIC 519 on the outer side of PIC substrate 515, the Tx PICs 509 and Tx EIC 519 can contact the PIC lid 522 through a thermal interface material and dissipate heat to the PIC lid 522.

Figure 6:
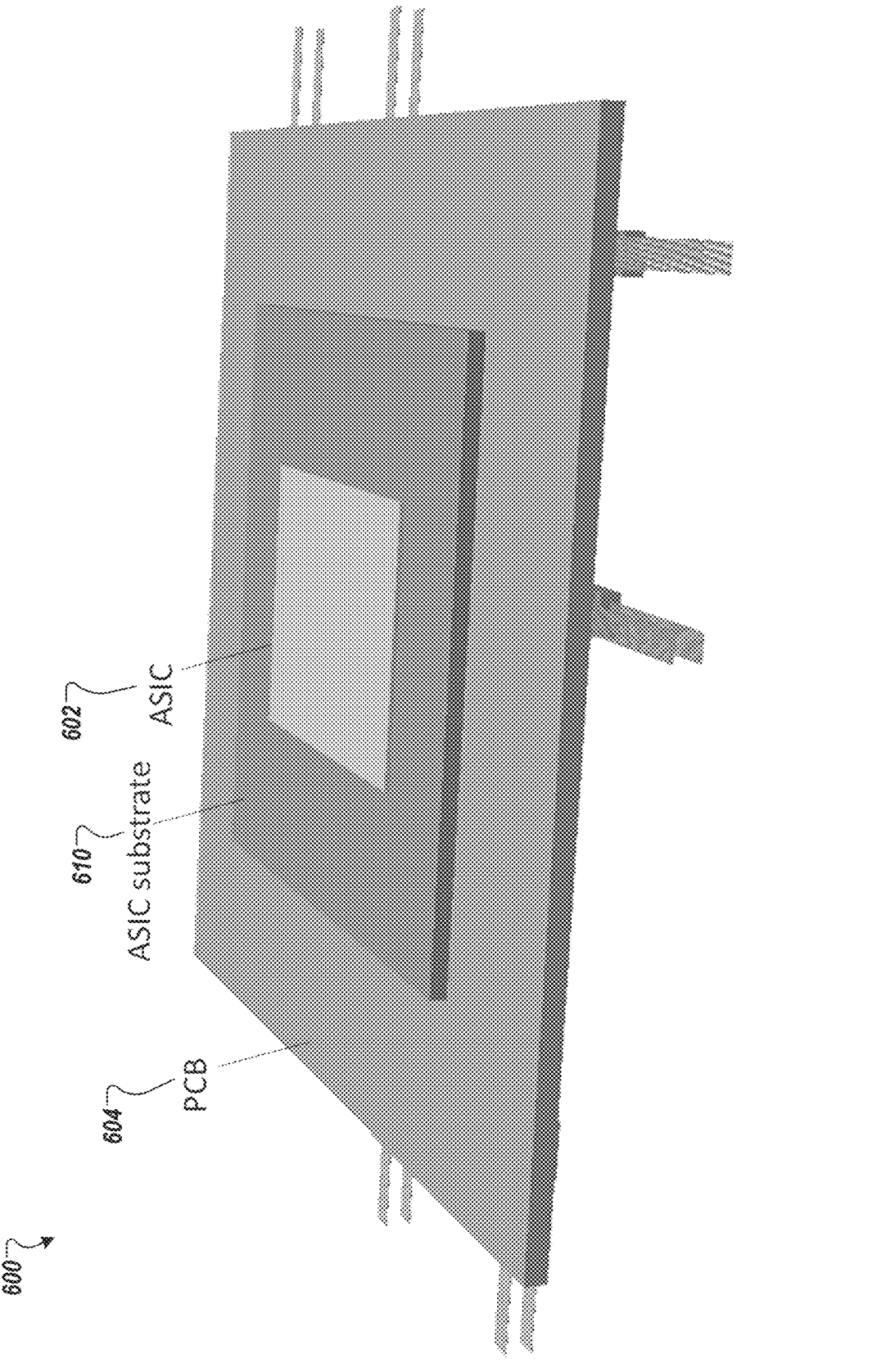
FIG. 6 illustrates an example of a 3D rendering of the CIU configuration, from the ASIC-side view.
Figure 7:
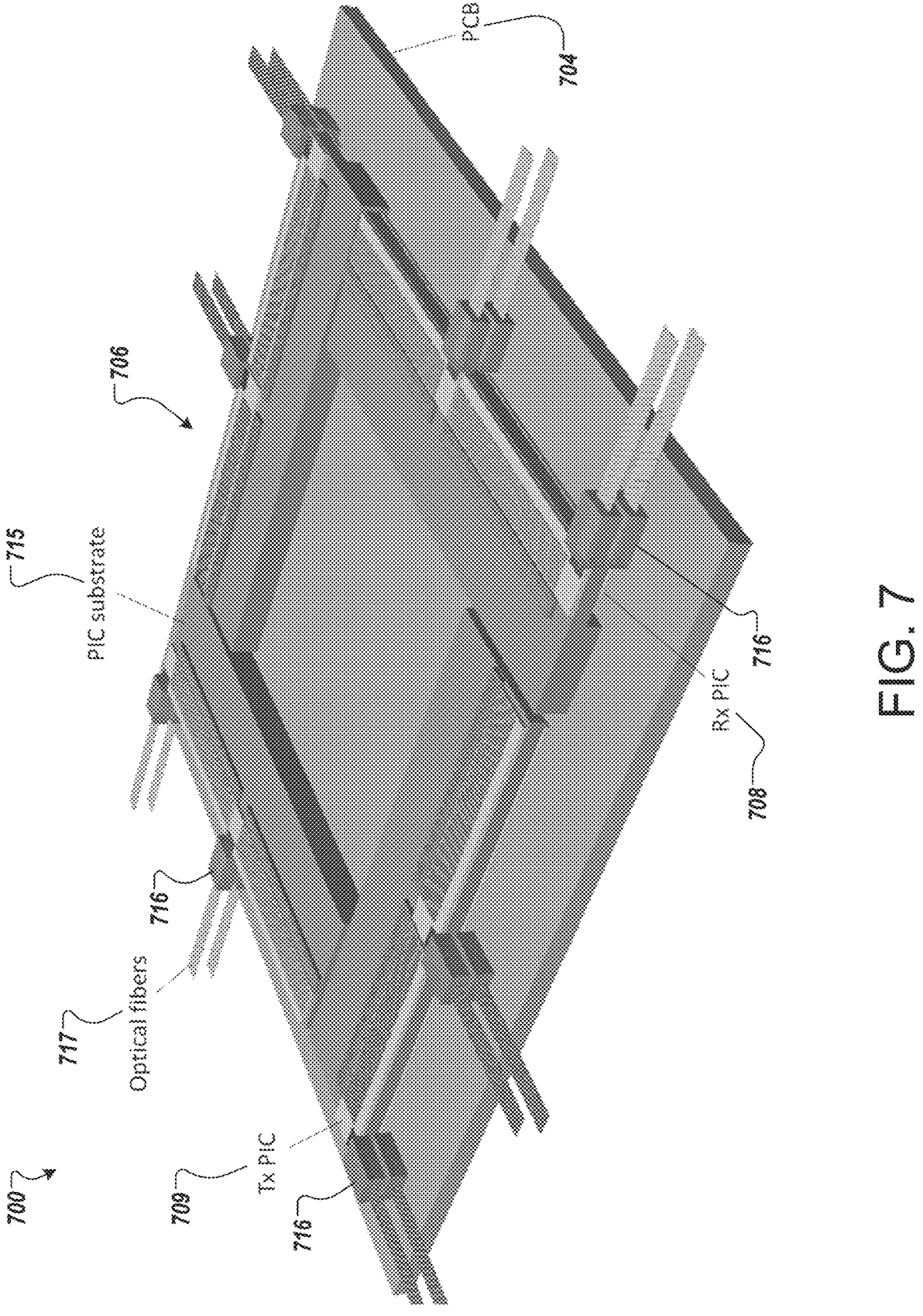
FIG. 7 illustrates an example of a 3D rendering of the CIU configuration, from the PIC-side view.

FIGS. 6 and 7 illustrate examples of 3D renderings of CIU configurations according to implementations of the present disclosure.

FIG. 6 illustrates an example of a top 3D view of PCB 604 with ASIC configuration 600. In this example, ASIC 602 is arranged on ASIC substrate 610 which is mounted on PCB 604. In general, this top side of PCB 604 may be implemented in accordance with any of the descriptions of FIG. 2 to FIG. 5 discussed previously.

FIG. 7 illustrates an example of a bottom 3D view of PCB 704 with CIU configuration 700. This bottom side of PCB 704 may be implemented in accordance with any of the descriptions of FIG. 2 to FIG. 5 discussed previously. In this example, CIU 706 consists of four sections, arranged in a square under the ASIC (e.g., ASIC 602 in FIG. 6), on the other side of the PCB 704 from the ASIC. This arrangement leaves open the center area of PCB 704 (underneath the ASIC substrate, such as ASIC substrate 610 in FIG. 6), and this open center area of PCB 704 is therefore available for power supplies, bypass capacitors, and other optical/electronic components. For example, in some implementations, it is important that power supplies for the ASIC (e.g., ASIC 602 in FIG. 6) be as close as possible to the ASIC to mitigate resistive power losses. Furthermore, in this example, at least one PIC substrate 715 is composed of a stacked pair of substrates (e.g., PIC substrates 314 and 315 in FIG. 3, or PIC substrates 414 and 415 in FIG. 4A, or PIC substrates 514 and 515 in FIG. 5). The Tx PICs 709 and associated Tx EICs are arranged on the outer edge side of the outer PIC substrate (e.g., outer PIC substrate 315, 415, or 515), and the Rx PICs 708 and associated Rx EICs are on the inner side of the outer PIC substrate.

FIG. 8 is a flowchart illustrating an example method 800 of interconnecting electronic circuit die with photonic circuit die on opposite sides of a PCB. The particular ordering of steps described in this example method 800 is not limiting, and in general, one or more steps of example method 800 may be performed in a different order.

In step 802, at least one electronic circuit die (e.g., ASIC 202, 302, 402, 502, or 602) is assembled on at least one first substrate (e.g., ASIC substrate 210, 310, 410, 510, or 610), as described with reference to FIGS. 1-6.

In step 804, the at least one first substrate is attached to a first side of a PCB. For example, the at least one first substrate may be soldered to the PCB (e.g., PCB 204, 304, 404, 504, or 604) by a ball-grid array (e.g., BGA 211 in FIG. 2), as described with reference to FIGS. 1-6. In some implementations, the at least one first substrate may be attached to the PCB by other techniques, such as other soldering techniques or by pluggable sockets.

In step 806, at least one photonic circuit die (e.g., PIC(s) 208, 308, 309, 408, 409, 508, 509, 708, and/or 709) is optionally attached to a PLC die, and this PIC-PLC unit is assembled on at least one second substrate (e.g., PIC substrate(s) 214, 314, 315, 414, 415, 514, 515, and/or 715) to form a CIU (e.g., CIU 206, 306, 406, 506, and/or 706), as described with reference to FIGS. 1-7. For example, in some implementations, the at least one second substrate may include multiple stacked substrates (e.g., PIC substrates 314 and 315 in FIG. 3) and the at least one photonic circuit die may include multiple photonic circuit die that are mounted on one or more of the second substrates (e.g., PICs 308 and 309 mounted on opposite sides of outer PIC substrate 315 in FIG. 3).

In step 808, the least one second substrate of the CIU is attached to a second side of the PCB, opposite the first side. For example, the at least one second substrate may be soldered to the PCB (e.g., PCB 204, 304, 404, 504, or 604) by a ball-grid array (e.g., BGA 213 in FIG. 2), as described with reference to FIGS. 1-7. In some implementations, the at least one second substrate may be attached to the PCB by other techniques, such as other soldering techniques or by pluggable sockets. In implementations where the at least one second substrate includes multiple stacked substrates (e.g., PIC substrates 314 and 315 in FIG. 3), the inner-most substrate (e.g., inner PIC substrate 314 in FIG. 3) is attached to the second side of the PCB.

In step 810, the at least one electronic circuit die (attached to the at least one first substrate) is interconnected with at least one photonic circuit die (attached to the at least one second substrate) through a plurality of electrical connections (e.g., electrical connections that include vias 212, 312, 412, and/or 512) that are formed through the PCB, as described with reference to FIGS. 1-5.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. An optical input/output (I/O) system comprising:
   at least one electronic circuit die on at least one first substrate that is attached to a first side of a printed circuit board (PCB), wherein the at least one electronic circuit die comprises at least 4 electrical inputs and at least 4 electrical outputs that are each configured to operate with a speed of at least 10 Gb/s;
   at least one photonic circuit die and at least one electronic integrated circuit (EIC) that are attached to and electrically coupled via at least one second substrate, wherein:
   the at least one second substrate is attached via at least one pluggable socket to a second side of the PCB, opposite the first side of the PCB, and
   the at least one EIC comprises at least 4 electrical inputs and at least 4 electrical outputs;
   wherein the at least one first substrate and the at least one second substrate are separate and independently attachable to respective opposite sides of the PCB; and
   a plurality of electrical connections through the PCB that form part of an electrical connection between the at least 4 electrical inputs and the at least 4 electrical outputs of the at least EIC with the at least 4 electrical inputs and the at least 4 electrical outputs of the at least one electronic circuit die.

2. The optical I/O system of claim 1, wherein the plurality of electrical connections through the PCB comprise a plurality of straight-line vias in the PCB that connect the at least 4 electrical inputs and the at least 4 electrical outputs of the at least one EIC with the at least 4 electrical inputs and the at least 4 electrical outputs of the at least one electronic circuit die.

3. The optical I/O system of claim 1, wherein the at least one first substrate is attached to the first side of the PCB by a ball-grid array (BGA),
   wherein the at least one second substrate is attached to the second side of the PCB by a pluggable socket, and
   wherein the BGA and the pluggable socket are connected to the plurality of electrical connections.

4. The optical I/O system of claim 1, wherein the at least one second substrate attached to the second side of the PCB comprises a plurality of second substrates that are stacked on each other.

5. The optical I/O system of claim 1, wherein the at least one photonic circuit die attached to the at least one second substrate comprises at least one photonic integrated circuit (PIC) comprising at least one of a transmitter PIC or a receiver PIC.

6. The optical I/O system of claim 5, further comprising at least one of (i) driving circuitry for the transmitter PIC or (ii) transimpedance amplification (TIA) circuitry for the receiver PIC.

7. The optical I/O system of claim 6, wherein at least one of the driving circuitry for the transmitter PIC or the TIA circuitry for the receiver PIC is integrated in the at least one electronic circuit die.

8. The optical I/O system of claim 6, wherein at least one of the driving circuitry for the transmitter PIC or the TIA circuitry for the receiver PIC is implemented as an electronic die on the second side of the PCB, adjacent to the transmitter PIC or the receiver PIC.

9. The optical I/O system of claim 6, wherein at least one of the driving circuitry for the transmitter PIC or the TIA circuitry for the receiver PIC comprises a complementary metal-oxide semiconductor (CMOS) equalizer.

10. The optical I/O system of claim 5, further comprising control circuitry for the at least one PIC, which is implemented inside at least one of the at least one EIC for the at least one PIC and a separate EIC.

11. The optical I/O system of claim 5, wherein the at least one PIC comprises a plurality of PICs that are attached to a given substrate among the at least one second substrate,
    wherein a first PIC is attached to a first side of the given substrate that faces towards the PCB, and
    wherein a second PIC is attached to a second side of the given substrate that faces away from the PCB, opposite the first side of the given substrate.

12. The optical I/O system of claim 1, wherein the at least one second substrate is arranged on at least one edge of the second side of the PCB.

13. The optical I/O system of claim 1, further comprising a lid for the at least one photonic circuit die that comprises mounts for a plurality of fiber array connectors.

14. The optical I/O system of claim 1, wherein the at least one photonic circuit die comprises photonic circuits that are made from silicon photonics.

15. The optical I/O system of claim 1, wherein the at least one photonic circuit die comprises a planar lightwave circuit (PLC) that is connected to at least one PIC and to at least one optical fiber.

16. The optical I/O system of claim 15, wherein the PLC comprises a waveguide power splitter.

17. The optical I/O system of claim 15, wherein the PLC comprises at least one of a wavelength multiplexer or a wavelength demultiplexer.

18. The optical I/O system of claim 15, wherein the PLC overhangs an edge of a substrate among the at least one second substrate.

19. The optical I/O system of claim 1, wherein the at least one photonic circuit die is arranged around a perimeter of a region in which components for the at least one electronic circuit die are arranged.

20. A method of co-packaging at least one electronic circuit die with at least one photonic circuit die on a printed circuit board (PCB), the method comprising:

assembling the at least one electronic circuit die on at least one first substrate;

assembling the at least one photonic circuit die and at least one electronic integrated circuit (EIC) on at least one second substrate so that the at least one photonic circuit die is electrically coupled to the at least one EIC, wherein the at least one first substrate and the at least one second substrate are separate and independently attachable to the PCB;

soldering the at least one first substrate to a first side of the PCB;

removably attaching, without soldering, the at least one second substrate to a second side of the PCB, opposite the first side of the PCB; and interconnecting the at least one electronic circuit die and the at least one EIC with a plurality of electrical connections through the PCB.

21. The method of claim 20, wherein the at least one electronic circuit die comprises at least 4 electrical inputs and at least 4 electrical outputs that are each configured to operate with a speed of at least 10 Gb/s.

22. The method of claim 20, wherein assembling the at least one photonic circuit die on the at least one second substrate comprises:

assembling a plurality of photonic circuit die on a plurality of substrates that are stacked on each other.

23. The method of claim 22, wherein assembling the at least one photonic circuit die on the at least one second substrate comprises:

attaching a plurality of photonic integrated circuits (PICs) to a given substrate among the plurality of substrates, wherein a first PIC is attached to a first side of the given substrate that faces towards the PCB, and wherein a second PIC is attached to a second side of the given substrate that faces away from the PCB, opposite the first side of the given substrate.

24. The method of claim 20, wherein the at least one photonic circuit die is arranged around a perimeter of a region in which components for the at least one electronic circuit die are arranged.

25. The method of claim 20, wherein attaching the at least one first substrate to the first side of the PCB comprises soldering the at least one first substrate to the first side of the PCB by a ball-grid array (BGA), wherein attaching the at least one second substrate to the second side of the PCB comprises connecting the at least one second substrate to the second side of the PCB by a pluggable socket, and wherein the BGA and the pluggable socket are connected to the plurality of electrical connections through the PCB.

26. The method of claim 20, wherein the plurality of electrical connections through the PCB comprises a plurality of straight-line vias in the PCB that connect the at least one EIC with at least 4 electrical inputs and at least 4 electrical outputs of the at least one electronic circuit die.

27. An optical input/output (I/O) system comprising:

at least one electronic circuit die on at least one first substrate attached to a first side of a printed circuit board (PCB);

at least one photonic circuit die and at least one electronic integrated circuit (EIC) that are attached to and electrically coupled via at least one second substrate, wherein:

the at least one second substrate is removably attached, without soldering, to a second side of the PCB, opposite the first side of the PCB; and a plurality of electrical connections that electrically connect the at least one EIC with the at least one electronic circuit die through the PCB.

28. An optical input/output (I/O) system comprising:

at least one electronic circuit die on at least one first substrate attached to a first side of a printed circuit board (PCB), wherein the at least one electronic circuit die comprises at least 4 electrical inputs and at least 4 electrical outputs that are each configured to operate with a speed of at least 10 Gb/s;

at least one connector on at least one second substrate configured to removably attach the at least one second substrate to a second side of the PCB, opposite the first side of the PCB, wherein the at least one connector comprises at least one pluggable socket; and a plurality of electrical connections through the PCB that electrically connect the at least one connector with the at least 4 electrical inputs and the at least 4 electrical outputs of the at least one electronic circuit die.

* * * * *